(12) United States Patent
Xiong et al.

(10) Patent No.: US 12,283,089 B2
(45) Date of Patent: Apr. 22, 2025

(54) HEAD IMAGE EDITING BASED ON FACE EXPRESSION CLASSIFICATION

(71) Applicant: TENCENT TECHNOLOGY (SHENZHEN) COMPANY LIMITED, Shenzhen (CN)

(72) Inventors: Wei Xiong, Shenzhen (CN); Fei Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/114,062

(22) Filed: Feb. 24, 2023

(65) Prior Publication Data

US 2023/0222770 A1 Jul. 13, 2023

Related U.S. Application Data

(63) Continuation of application No. 17/006,071, filed on Aug. 28, 2020, now Pat. No. 11,631,275, which is a (Continued)

(30) Foreign Application Priority Data

Jul. 23, 2018 (CN) .......................... 201810812675.4

(51) Int. Cl.
G06V 10/764 (2022.01)
G06F 18/21 (2023.01)
(Continued)

(52) U.S. Cl.
CPC .......... G06V 10/764 (2022.01); G06F 18/214 (2023.01); G06F 18/217 (2023.01);
(Continued)

(58) Field of Classification Search
CPC ............... G06K 9/6262; G06K 9/6273; G06K 9/00288; G06K 9/6256; G06K 9/00302;
(Continued)

(56) References Cited

U.S. PATENT DOCUMENTS

2018/0330178 A1  11/2018  el Kaliouby et al.
2019/0205616 A1   7/2019  Hong

FOREIGN PATENT DOCUMENTS

CN  102436636 A    5/2012
CN  104063683 A  * 9/2014
(Continued)

OTHER PUBLICATIONS

A machine translated English version of Document CN107909065, (Year: 2018).*

(Continued)

Primary Examiner — Ruiping Li
(74) Attorney, Agent, or Firm — ArentFox Schiff LLP

(57) ABSTRACT

Aspects of the disclosure provide an image processing method, an image processing terminal, an image processing apparatus, and a non-transitory computer-readable storage medium. The method can include performing face detection on a target image to detect a face region in the target image. The method includes determining an expression class of the detected face region based on a trained expression recognition model and determining whether the determined expression class of the detected face region is a target expression class. If the determined expression class is the target expression class, head detection is performed to identify a head region in the target image and the identified head region is edited. If the determined expression class is not the target expression class, the head detection is not performed on the target image.

20 Claims, 6 Drawing Sheets

Related U.S. Application Data continuation of application No. PCT/CN2019/089825, filed on Jun. 3, 2019.

(51) Int. Cl.
  *G06F 18/214* (2023.01)
  *G06T 3/40* (2024.01)
  *G06V 10/774* (2022.01)
  *G06V 10/776* (2022.01)
  *G06V 10/82* (2022.01)
  *G06V 40/16* (2022.01)

(52) U.S. Cl.
  CPC .............. *G06T 3/40* (2013.01); *G06V 10/774* (2022.01); *G06V 10/776* (2022.01); *G06V 10/82* (2022.01); *G06V 40/161* (2022.01); *G06V 40/172* (2022.01); *G06V 40/174* (2022.01)

(58) Field of Classification Search
  CPC ..... G06K 9/00228; G06T 3/40; G06F 18/214; G06F 18/217; G06V 10/764; G06V 10/774; G06V 10/776; G06V 10/82; G06V 40/161; G06V 40/172; G06V 40/174
  See application file for complete search history.

(56) References Cited

FOREIGN PATENT DOCUMENTS

| CN | 104063865 | A | | 9/2014 | |
|----|-----------|---|---|--------|---|
| CN | 105404845 | | * | 3/2016 | |
| CN | 105404845 | A | * | 3/2016 | |
| CN | 106096551 | A | | 11/2016 | |
| CN | 106295566 | A | | 1/2017 | |
| CN | 106709404 | A | | 5/2017 | |
| CN | 107341434 | A | | 11/2017 | |
| CN | 107680069 | A | | 2/2018 | |
| CN | 107844781 | A | | 3/2018 | |
| CN | 107909065 | | * | 4/2018 | |
| CN | 107909065 | A | * | 4/2018 | ......... G06K 9/00228 |
| CN | 108280388 | A | | 7/2018 | |
| JP | 2009199417 | A | | 9/2009 | |
| JP | 2010086178 | A | | 4/2010 | |
| JP | 2010218551 | A | | 9/2010 | |
| JP | 2013242571 | A | | 12/2013 | |
| JP | 2018055470 | A | | 4/2018 | |
| KR | 101835531 | B1 | | 3/2018 | |
| WO | 2012002048 | A1 | | 1/2012 | |

OTHER PUBLICATIONS

A machine translated English version of Document CN105404845 (Year: 2016).*

A machine translated English version of CN104063683. (Year: 2014).*

International Search Report and Written Opinion in PCT/CN2019/089825, mailed Sep. 5, 2019 6 pages.

Office Action in CN201810812675.4, mailed Dec. 20, 2022, 11 pages.

Office Action in JP2020561766, mailed Dec. 21, 2021, 12 pages.

Office Action in KR20207028918, mailed Jun. 28, 2022, 13 pages.

* cited by examiner

HEAD IMAGE EDITING BASED ON FACE EXPRESSION CLASSIFICATION

RELATED APPLICATION

This application is a continuation of U.S. application Ser. No. 17/006,071, filed on Aug. 28, 2020, which is a continuation of International Application No. PCT/CN2019/089825, filed on Jun. 3, 2019, which claims priority to Chinese Patent Application No. 201810812675.4, entitled "IMAGE PROCESSING METHOD AND APPARATUS, TERMINAL, AND STORAGE MEDIUM" filed on Jul. 23, 2018. The entire disclosures of the prior applications are hereby incorporated by reference in their entirety.

FIELD OF THE TECHNOLOGY

Embodiments of the present disclosure relate to the field of computer technologies, including to an image processing method and apparatus, a terminal, and a computer-readable storage medium.

BACKGROUND OF THE DISCLOSURE

With the increasing popularity of the Internet and the rapid development of multimedia technologies, multimedia data such as photos and short videos have been widely spread on the Internet, and various image processing modes have emerged. Among these modes, one novel, unique, and interesting mode is to recognize a head region in an image and edit the head region and is widely popular among users.

For an image in a photo or a short video, in a case that a user wants to edit a head in the image, a rectangular box may be determined at the position of the head by using a swipe operation or a drag operation, so that the head is located inside the rectangular box. A terminal uses the rectangular box determined by the user as the head region, and edits the head region.

By using the foregoing mode of manually determining a rectangular box by a user, a head region includes a head and a region surrounding the head. As a result, a determined head region is inaccurate, leading to an inadequate editing effect.

SUMMARY

According to embodiments of this application, an image processing method and apparatus, a terminal, and a non-transitory computer-readable storage medium are provided.

An image processing method is performed by a terminal, and can include obtaining a trained pixel classification model, the pixel classification model being used for determining a classification identifier of each pixel in any image, the classification identifier at least including a head classification identifier, the head classification identifier being used for indicating that a corresponding pixel is located in a head region. The image processing method can include classifying each pixel in a target image based on the pixel classification model to obtain a classification identifier of the pixel in the target image, and determining a head region in the target image according to a head classification identifier in the classification identifier, and editing the head region.

An image processing apparatus can include processing circuitry configured to obtain a trained pixel classification model, the pixel classification model being used for determining a classification identifier of each pixel in any image, the classification identifier at least including a head classification identifier, the head classification identifier being used for indicating that a corresponding pixel is located in a head region. The image processing apparatus can further include processing circuitry configured to classify each pixel in a target image based on the pixel classification model to obtain a classification identifier of the pixel in the target image, and determine a head region in the target image according to a head classification identifier in the classification identifier, and edit the head region.

An image processing terminal includes a processor and a memory that stores at least one instruction, at least one program, a code set or an instruction set, the instruction, the program, the code set or the instruction set being loaded by the processor to perform the steps of the image processing method.

A non-transitory computer-readable storage medium that stores at least one instruction, at least one program, a code set or an instruction set, the instruction, the program, the code set or the instruction set that is loaded by the processor to perform the steps of the image processing method.

Details of one or more embodiments of this application are provided in the accompanying drawings and descriptions below. Other features and advantages of this application will become apparent from the specification, the accompanying drawings, and the claims.

BRIEF DESCRIPTION OF THE DRAWINGS

To describe the technical solutions in the embodiments of the present disclosure, the following briefly describes the accompanying drawings that describe exemplary embodiments. The accompanying drawings in the following description show exemplary embodiments of the present disclosure, and a person of ordinary skill in the art may still derive other drawings from the accompanying drawings.

DESCRIPTION OF EMBODIMENTS

To make the objectives, technical solutions, and advantages of this application clearer and more comprehensible, this application is further described below in detail with reference to the accompanying drawings and the exemplary embodiments. It is to be understood that the specific embodiments described herein are only used to describe this application rather than to limit this application.

In a case that a head region in a target image needs to be edited, the head region is usually first manually determined by a user. As a result, the determined head region includes a head and a region surrounding the head, making it impossible to implement fine matting of head edges. An embodiment of the present disclosure provides an image processing method to classify pixels in the target image based on a pixel classification model, to determine the head region in the target image, thereby implementing pixel-level head recognition, so that fine matting of head edges can be implemented. In addition, the head region obtained through fine matting is edited, thereby improving accuracy.

This embodiment of the present disclosure may be applied to any scenario in which a head region in an image is edited. For example, in a case that a terminal shoots a photo, the method according to this embodiment of the present disclosure can be used for editing a head region in the photo. Alternatively, in a case that a terminal has shot a video or is shooting a video, the method according to this embodiment of the present disclosure can be used for editing a head region in each frame of image in the video. Alternatively, a third-party application specially used for editing an image is installed on a terminal. A photo or a video in a gallery may be invoked in the third-party application, and the method according to this embodiment of the present disclosure may be used for editing a head region in the photo or the video. The edited photo and video is stored in the gallery. The foregoing gallery may be a local gallery or a gallery on a server side.

Figure 1A:
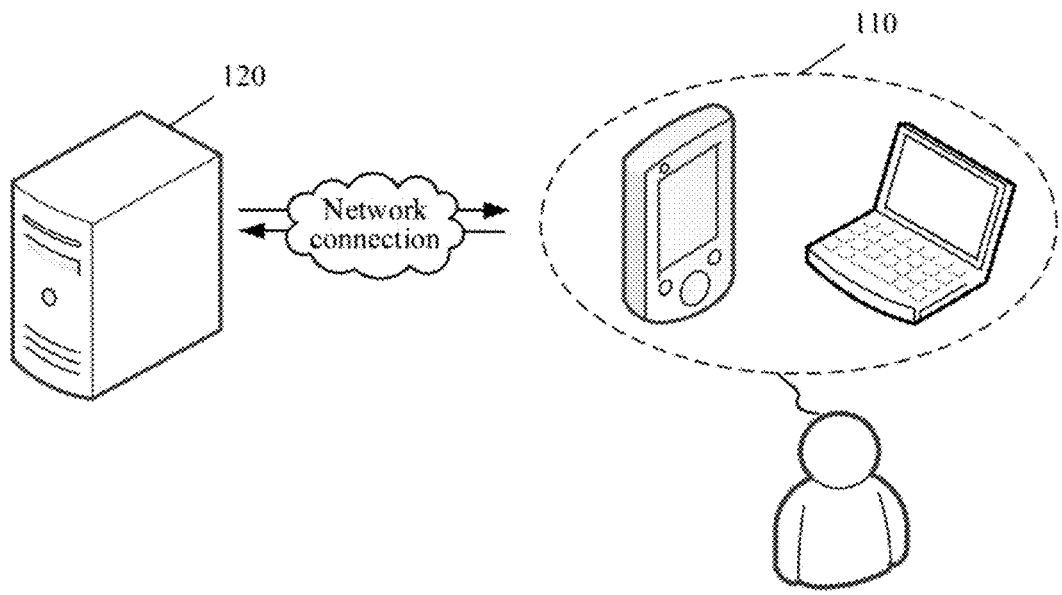
FIG. 1a is a diagram of an application environment of an image processing method according to an embodiment of the present disclosure.

FIG. 1a is a diagram of an application environment of an image processing method according to an embodiment. Referring to FIG. 1a, the image processing method is applied to an image processing system. The image processing system includes a terminal 110 and a server 120. The terminal 110 is connected to the server 120 by a network. The terminal 110 acquires a target image (or video) by using a camera or obtains a target image (or video) from a gallery on the server 120 or a local gallery. Next, a trained pixel classification model is obtained, the pixel classification model being used for determining a classification identifier of each pixel in any image, the classification identifier at least including a head classification identifier, the head classification identifier being used for indicating that a corresponding pixel is located in a head region. Each pixel in the target image is classified based on the pixel classification model to obtain a classification identifier of the pixel in the target image. The head region in the target image is determined according to the head classification identifier in the classification identifier, and the head region is edited.

The terminal 110 may be specifically a desktop terminal or a mobile terminal. The mobile terminal may be specifically at least one of a mobile phone, a tablet computer, a notebook computer, and the like. The server 120 may be implemented by an independent server or a server cluster formed by a plurality of servers.

Figure 1B:
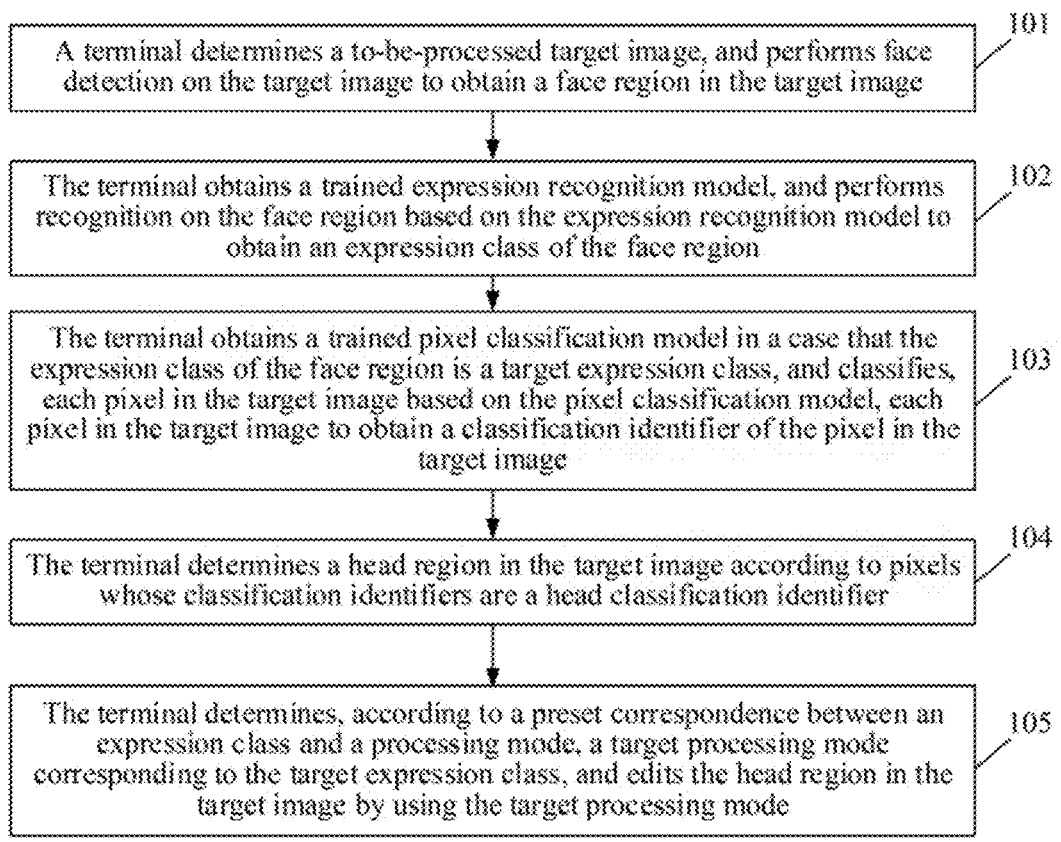
FIG. 1B is a flowchart of an image processing method according to an embodiment of the present disclosure.

FIG. 1B is a flowchart of an image processing method according to an embodiment of the present disclosure. This embodiment of the present disclosure is executed by a terminal. Referring to FIG. 1B, the method can include the following steps.

In step 101, a terminal determines a to-be-processed target image, and performs face detection on the target image to obtain a face region in the target image.

In step 102, the terminal obtains a trained expression recognition model, and performs recognition on the face region based on the expression recognition model to obtain an expression class of the face region. This embodiment of the present disclosure is applied to a scenario in which a head region in a target image is edited. The terminal may determine the to-be-processed target image, and perform editing after the head region in the target image is recognized.

In addition, the terminal may perform editing according to an expression of the face region in the target image. In addition to the face region, the target image determined by the terminal may further include a non-face region. In this case, face detection is performed on the target image to obtain the face region, and the expression recognition model is obtained. The face region is inputted into the expression recognition model and recognized to obtain the expression class.

When performing the face detection, a preset face detection algorithm may be used, or a face detection interface provided by the terminal may be invoked to perform the face detection on the target image. The expression recognition model is used for classifying the face region into at least two expression classes, for example, a surprised expression and a happy expression. The at least two expression classes may be determined during the training of the expression recognition model.

In the process of training the expression recognition model, a training apparatus may obtain a plurality of sample face images and an expression class of each sample face image, and perform iterative training repeatedly according to the plurality of sample face images and the expression class of each sample face image to obtain the expression recognition model, until a recognition accuracy of the trained expression recognition model reaches a second preset threshold. In a possible implementation, the training apparatus may build an initial expression recognition model and obtain a training data set and a test data set. Each of the training data set and the test data set includes a plurality of sample face images and corresponding expression classes. For example, the training apparatus may use a crawler program to capture face images in a network to obtain the plurality of sample face images, and mark the expression class of each sample face image.

In a training stage, the plurality of sample face images in the training data set are used as inputs of the expression recognition model, and the corresponding expression classes are used as outputs of the expression recognition model. The iterative training is performed on the expression recognition model, so that the expression recognition model can learn expression features in the face images, to provide an expression recognition capability. Next, each sample face image in the test data set is used as an input of the expression recognition model, and a test expression class corresponding to each sample face image is obtained based on the expression recognition model. The test expression class is compared with a marked actual expression class, to determine a recognition accuracy of the expression recognition model. In a case that the recognition accuracy of the expression recognition model is less than the second preset threshold, training continues to be performed according to the training data set and is completed when the recognition accuracy of the trained expression recognition model reaches the second preset threshold.

The second preset threshold may be determined according to an accuracy requirement and a calculation amount requirement of the expression recognition, and may be a value such as 95% or 99%. The training apparatus may be the terminal itself or another device other than the terminal, for example, a server. After offline training, the training apparatus transmits the expression recognition model to the terminal for use. The training apparatus may use at least one of training algorithms such as a linear classifier, a support vector machine, a deep neural network, and a decision tree to train the expression recognition model. Correspondingly, the trained expression recognition model may include at least one of a linear classifier model, a support vector machine model, a deep neural network model, and a decision tree model.

Figure 2:
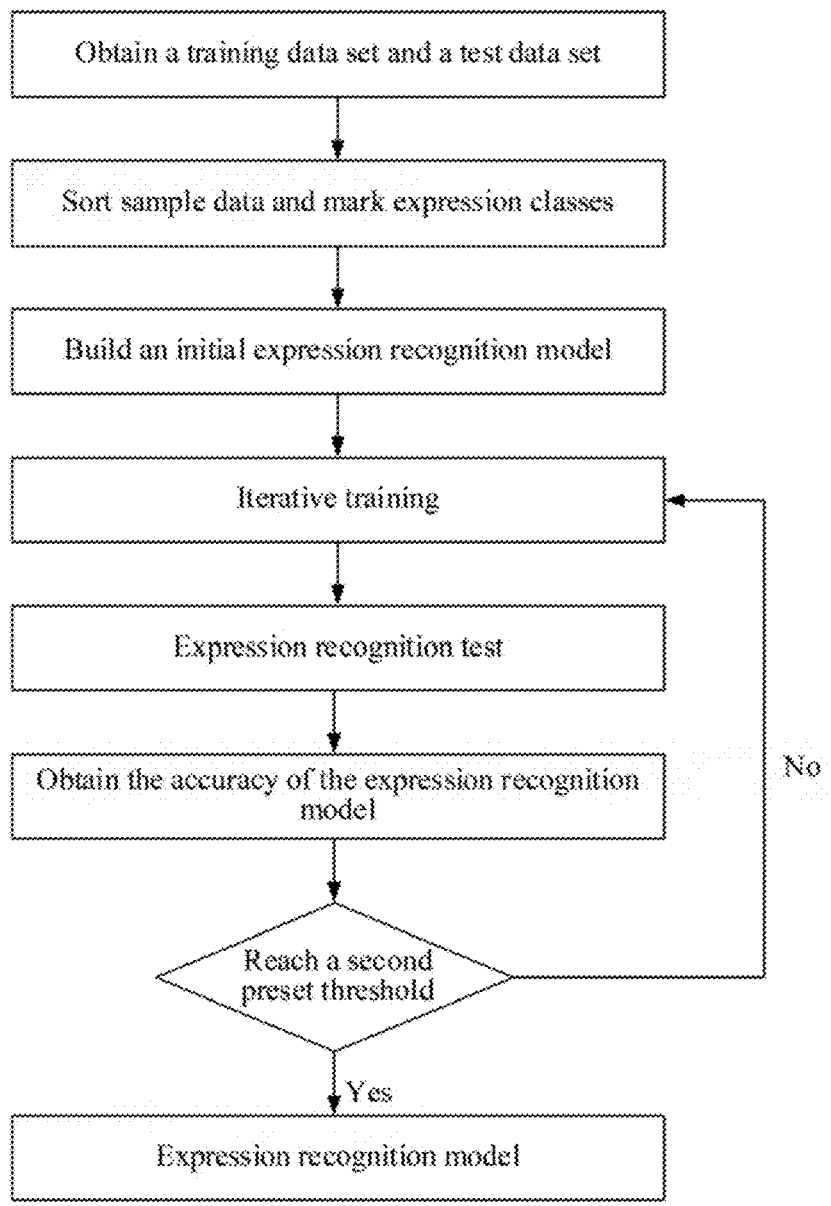
FIG. 2 is a flowchart of training an expression recognition model according to an embodiment of the present disclosure.

For example, a flowchart of training the expression recognition model may be shown in FIG. 2. For example, the expression recognition model is a Mobilenet (a lightweight deep neural network model). The network model has a fast operation speed, a small network model size, and a relatively high recognition accuracy, and can quickly respond to a large number of demands of users thereby reducing backend load.

Assuming that the size of an inputted target image is 224*224, parameters in each network layer of the network model may be shown in the following Table 1.

TABLE 1

| Network layer/stride | Convolution kernel/quantity of channels | Size of feature maps |
| --- | --- | --- |
| Conv/s2 | 3*3/32 | 112*112*32 |
| DepthSepConv/s1 | 3*3/64 | 112*112*64 |
| DepthSepConv/s2 | 3*3/128 | 56*56*128 |
| DepthSepConv/s1 | 3*3/128 | 56*56*128 |
| DepthSepConv/s2 | 3*3/256 | 28*28*128 |
| DepthSepConv/s1 | 3*3/256 | 28*28*256 |
| DepthSepConv/s2 | 3*3/512 | 14*14*512 |
| DepthSepConv/s1*5 | 3*3/512 | 14*14*512 |
| DepthSepConv/s2 | 3*3/1024 | 7*7*1024 |
| DepthSepConv/s1 | 3*3/1024 | 7*7*1024 |
| pooling | 7*7 | 1*1*1024 |
| Conv/s1 | 3*3*N | 1*1*N |

"Cony" is a convolutional layer, a network layer of "DepthSepConv" is a depthwise separable convolutional layer in which a 3*3 deep convolution operation is performed first and a 1*1 point cloud convolution operation is then performed, and "pooling" is a pooling layer.

A stride parameter of a convolution operation of each network layer is s1 or s2, the value of s1 being 1, the value of s2 being 2. The size of the feature map of each network layer is the size of data outputted by the network layer, and the size of the feature map outputted by the last layer is 1*1*N, N being the quantity of expression classes.

It can be seen from the foregoing network model that after the 224*224 target image is inputted into the expression recognition model, N-dimensional data is eventually outputted, and data having the highest probability in the N-dimensional data may be calculated through softmax (flexible maximum transfer function). The N-dimensional data may represent probabilities that a facial expression in the target image belongs to N expression classes, the data having the highest probability being an expression class that the facial expression in the target image is most likely to belong to.

In step 103, the terminal obtains a trained pixel classification model in a case that the expression class of the face region is a target expression class, and classifies each pixel in the target image based on the pixel classification model to obtain a classification identifier of the pixel in the target image. The terminal may set one or more target expression classes and edit a head region in the target image only when the target image has a face region matching the target expression class. Therefore, in a case that the terminal determines the expression class of the face region in the target image based on the expression recognition model, it is determined whether the expression class is the target expression class. In a case that the expression class is not the target expression class, editing is stopped. However, in a case that the expression class is the target expression class, to recognize the head region in the target image, the terminal first obtains the pixel classification model, inputs the target image into the pixel classification model, and classifies each pixel in the target image to obtain a classification identifier of the pixel in the target image.

The pixel classification model is used for determining a classification identifier of a pixel in any image. The classification identifier includes a head classification identifier and a non-head classification identifier. The head classification identifier is used for indicating that a corresponding pixel is located in a head region. The non-head classification identifier is used for indicating that a corresponding pixel is located in a non-head region. In this way, each pixel can be classified into the head region or the non-head region. The head classification identifier and the non-head classification identifier are different classification identifiers determined during the training of the pixel classification model. For example, a head classification identifier is 1, and a non-head classification identifier is 0.

In the process of training the pixel classification model, a training apparatus may obtain a plurality of sample images and a classification identifier of each pixel in each sample image, and perform iterative training repeatedly according to the plurality of sample images and the classification identifier of each pixel in each sample image to obtain the pixel classification model, until a classification accuracy of the trained pixel classification model reaches a first preset threshold.

In a possible implementation, the training apparatus may build an initial pixel classification model and obtain a training data set and a test data set. Each of the training data set and the test data set includes a plurality of sample images and a classification identifier of each pixel in each sample image. For example, the training apparatus may use a crawler program to capture sample images in a network to obtain the plurality of sample images, and mark the classification identifier of each pixel in each sample image according to a head region in each sample image.

In a training stage, the plurality of sample images in the training data set are used as inputs of the pixel classification model, and the classification identifier of each pixel in the sample image is used as an output of the pixel classification model. The iterative training is performed on the pixel classification model, so that the pixel classification model can learn features of a head region in the sample image, to provide the capability of classifying pixels in the head region. Next, each sample image in the test data set is used as an input of the pixel classification model, a test classification identifiers of each pixel in each sample image is obtained based on the pixel classification model, and the test classification identifier is compared with a marked actual classification identifier, to determine a classification accuracy of the pixel classification model. In a case that the classification accuracy of the pixel classification model is less than the first preset threshold, training continues to be performed according to the training data set and is completed when the classification accuracy of the trained pixel classification model reaches the first preset threshold.

The first preset threshold may be determined according to an accuracy requirement and a calculation amount requirement of pixel classification in the sample images, and may be a value such as 95% or 99%. The training apparatus may be the terminal itself or another device other than the terminal, for example, a server. After offline training, the training apparatus transmits the pixel classification model to the terminal for use. The training apparatus may use at least one of training algorithms such as a linear classifier, a support vector machine, a deep neural network, and a decision tree to train the pixel classification model. Correspondingly, the trained pixel classification model may include at least one of a linear classifier model, a support vector machine model, a deep neural network model, and a decision tree model.

Figure 3:
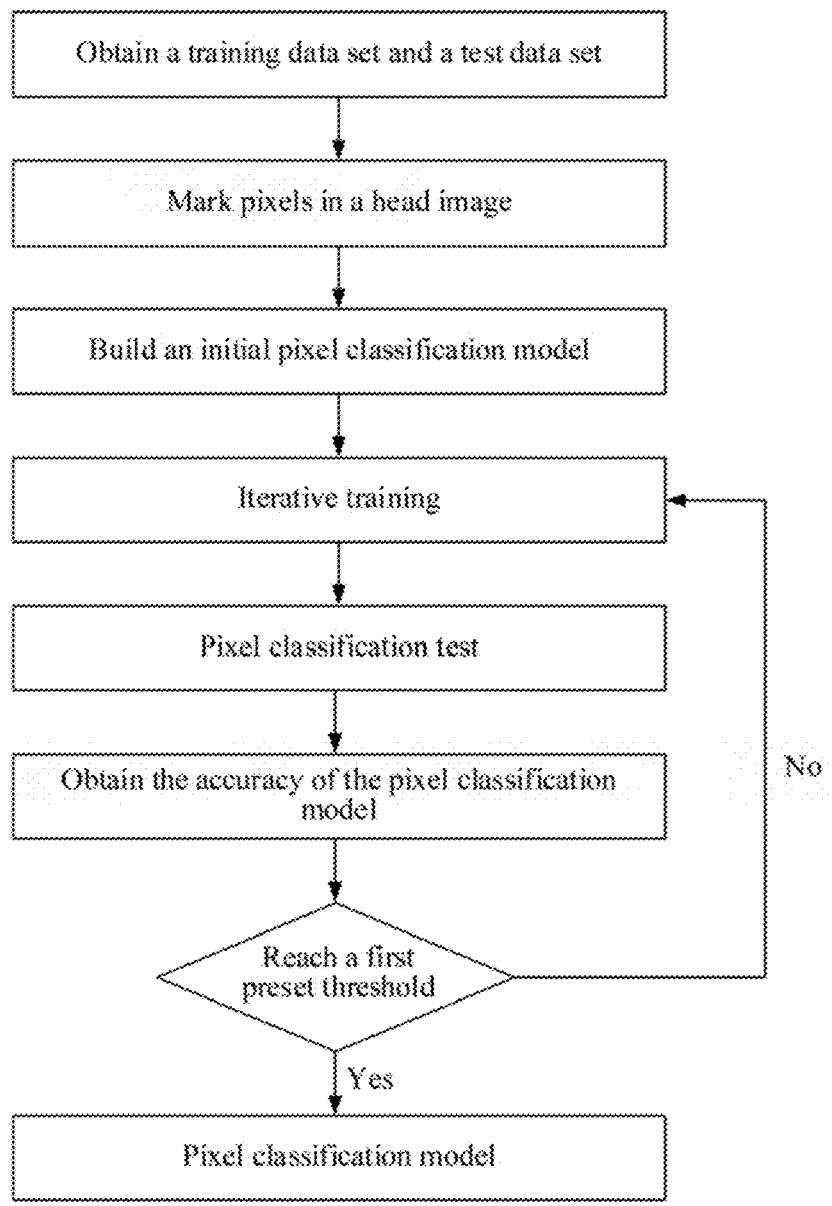
FIG. 3 is a flowchart of training a pixel classification model according to an embodiment of the present disclosure.
Figure 4:
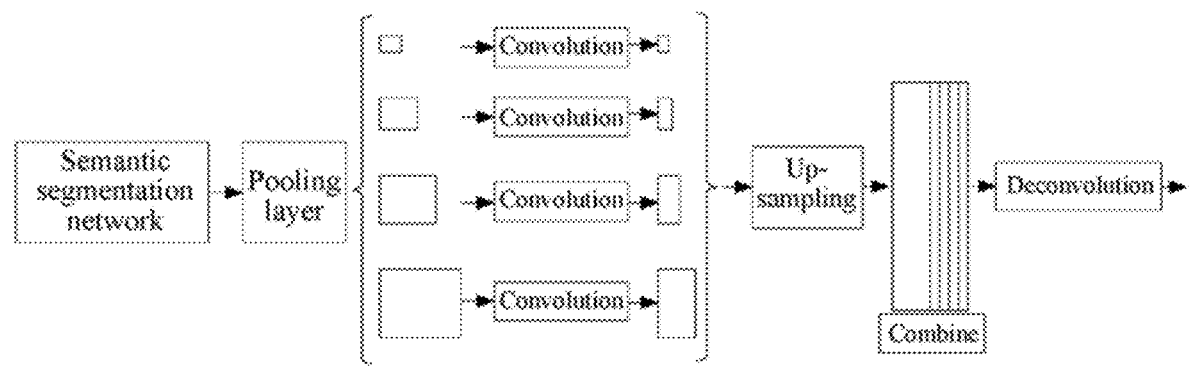
FIG. 4 is a schematic structural diagram of a pixel classification model according to an embodiment of the present disclosure.

For example, a flowchart of training the pixel classification model may be shown in FIG. 3. For example, the pixel classification model is a network model formed by a semantic segmentation network and a Mobilenet basic network model. Referring to FIG. 4, the target image is inputted into the network model, and coarse prediction is performed by using the semantic segmentation network. The size of the target image is then obtained through multi-resolution convolution and deconvolution operations. Each pixel in the target image is then classified. In a case that a classification identifier obtained through classification is 1, it is considered that the pixel is located in the head region, or otherwise, it is considered that the pixel is located in the non-head region.

In step 104, the terminal determines a head region in the target image according to pixels whose classification identifiers are a head classification identifier. After the classification identifier of each pixel in the target image is determined, a region formed by a plurality of pixels whose classification identifiers are a head classification identifier may be determined as the head region in the target image.

In step 105, the terminal determines, according to a preset correspondence between an expression class and a processing mode, a target processing mode corresponding to the target expression class, and edits the head region in the target image by using the target processing mode. In this embodiment of the present disclosure, the terminal may preset the preset correspondence between an expression class and a processing mode, indicating that a corresponding processing mode may be used to edit a head region belonging to a specific expression class. Therefore, the terminal determines the target processing mode corresponding to the target expression class, and edits the head region in the target image by using the target processing mode.

The processing mode set in the correspondence may include at least one of the following: scaling up or scaling down the head region, adding material to the head region, displaying a dynamic effect of shaking the head region, or other processing modes. The material that can be added may include a special light effect, a sticker, an accessory, and the like. For example, the preset correspondence between an expression class and a processing mode may be shown in Table 2.

TABLE 2

| Expression class | Processing mode |
| --- | --- |
| Surprised | Scale up the head region |
| Happy | Add a special light effect to the head region |
| Frightened | Shake the head region |
| Delighted | Add a sticker to the head region |
| . . . | . . . |

Figure 5:
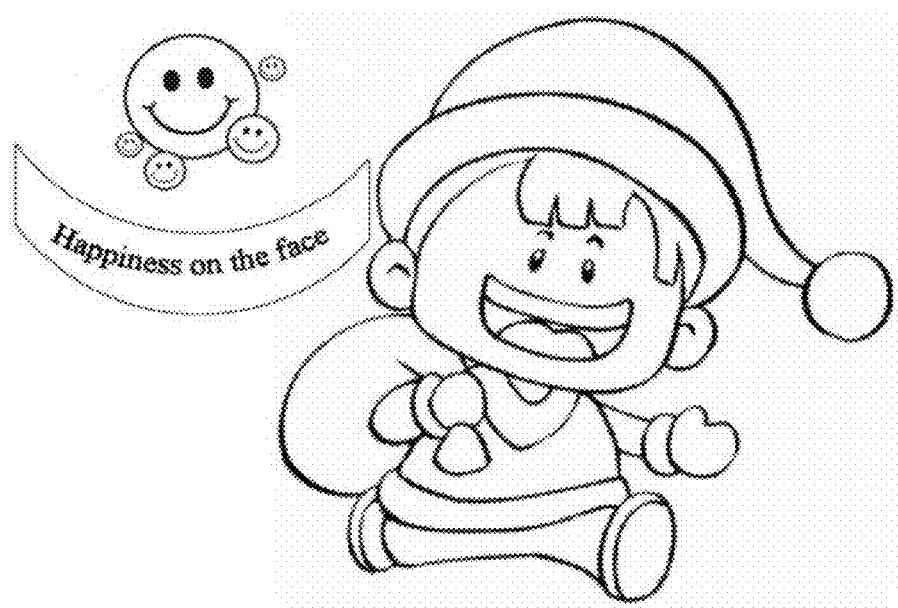
FIG. 5 is a schematic diagram of a processing effect of a head region according to an embodiment of the present disclosure.

Referring to FIG. 5, in a case that an expression in the target image is recognized as a "happy" class, a text sticker matching a happy expression "Happiness on the face" and a smiley face sticker are added on the left side of the head region in the target image.

In another embodiment, instead of setting the correspondence, the terminal may also edit the head region according to a preset processing mode in a case that the target image has a face region matching the target expression class. The preset processing mode can be set by the terminal by default or may be preset by a user or may be determined according to an editing operation in the target image by the user. For example, the terminal displays a sticker-adding option and a special light effect-adding option. In a case that a selection operation of the special light effect-adding option by the user is detected, a special light effect is added to the head region.

In this embodiment of the present disclosure, expression recognition is performed on the face region in the target image first, and the head region is edited only when the expression class is the target expression class. However, in another embodiment, instead of performing expression recognition on the face region in the target image, the terminal may also directly perform steps 103 to 105 to edit the head region in a case that the target image is obtained.

In this embodiment of the present disclosure, the target image is only used as an example for description, and the target image may be a single image or an image in a video. The single image or the video may be shot by the terminal or may be transmitted to the terminal by another device. For example, the terminal obtains a target video, the target video including a plurality of images arranged in sequence. Each of the plurality of images is used as the target image, and each pixel in the plurality of images in the video is classified. After a classification identifier is obtained, a head region in each image in the video may be edited by using the method provided in this embodiment of the present disclosure.

Figure 6:
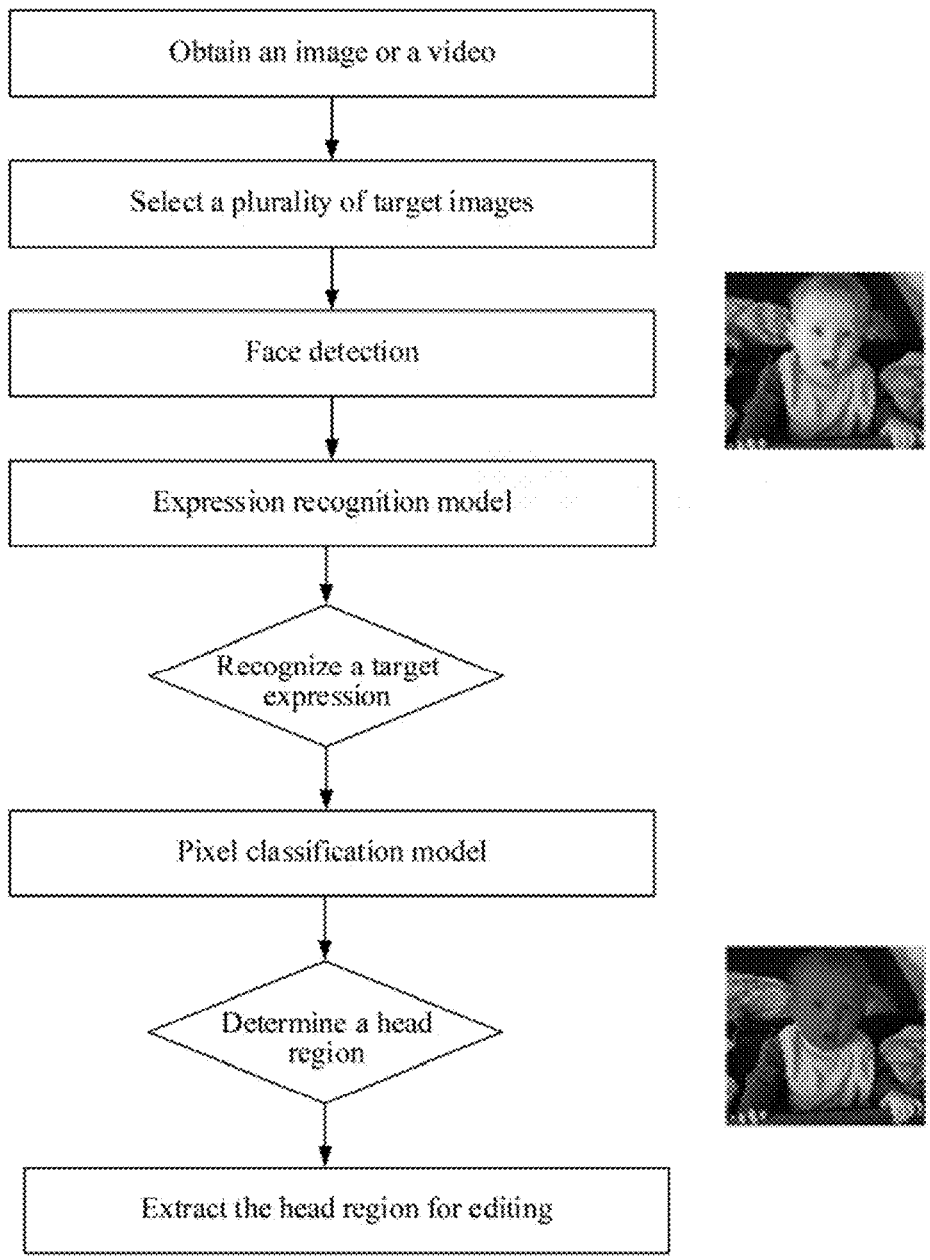
FIG. 6 is a flowchart of an image processing method according to an embodiment of the present disclosure.

FIG. 6 is a flowchart of an image processing method according to an embodiment of the present disclosure. Referring to FIG. 6, when a terminal shoots a video, face detection is first performed on each image in the video, and a detected face region is recognized based on an expression recognition model. In a case that a recognized expression class is a target expression class, pixel-level classification is performed on a target image based on a pixel classification model to determine a head region in the target image, and the head region is edited.

According to the method provided in this embodiment of the present disclosure, each pixel in a target image is classified based on a pixel classification model to obtain a classification identifier of the pixel in the target image; and a head region in the target image is determined according to pixels whose classification identifiers are a head classification identifier. A pixel in the target image can be classified based on the pixel classification model to determine the head region in the target image to implement pixel-level head recognition, so that fine matting of head edges can be implemented, thereby improving the accuracy of the head region and improving an editing effect of the head region.

In addition, before the head recognition is performed, expression recognition is first performed on the face region in the target image, and the pixel-level head recognition is then performed on the target image only when the expression class of the face region is the target expression class, so that a face region having a specific expression can be edited in a more targeted manner. Further, target processing mode corresponding to the target expression class can be used to edit the head region, to ensure that the processing mode matches an expression of the head region, thereby further improving a processing effect.

It is to be understood that steps in the flowcharts of FIG. 1B to FIG. 3 and FIG. 6 are shown in sequence based on the indication of arrows, but the steps are not necessarily performed in sequence based on the sequences indicated by the arrows. Unless otherwise explicitly specified in this application, the execution sequence of the steps is not strictly limited, and the steps may be performed in other sequences. Moreover, at least some of the steps in FIG. 1B to FIG. 3 and FIG. 6 may include a plurality of sub-steps or a plurality of stages. The sub-steps or stages are not necessarily performed at the same moment, but may be performed at different moments. The sub-steps or stages are not necessarily performed sequentially, but may be performed in turn or alternately with at least some of the other steps or sub-steps of other steps or stages.

Figure 7:
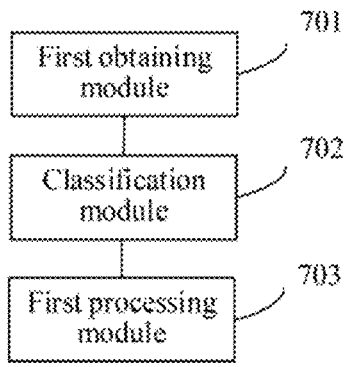
FIG. 7 is a schematic structural diagram of an image processing apparatus according to an embodiment of the present disclosure.

FIG. 7 is a schematic structural diagram of an image processing apparatus according to an embodiment of the present disclosure. Referring to FIG. 7, the apparatus can include a first obtaining module 701 that is configured to perform the step in the foregoing embodiments of obtaining a trained pixel classification model, and a classification module 702 that is configured to perform the step in the foregoing embodiments of classifying each pixel in a target image based on the pixel classification model. The apparatus can further include a first processing module 703 that is configured to perform the step in the foregoing embodiments of determining the head region in the target image and editing the head region. Of course, it should be understood that one or more of the modules described in this disclosure can be implemented by processing circuitry.

Additionally, the apparatus can further include a second obtaining module that is configured to perform the step in the foregoing embodiments of obtaining a plurality of sample images and a classification identifier of each pixel in the plurality of sample images, and a first training module that is configured to perform the step in the foregoing embodiments of performing training according to the plurality of sample images and the classification identifier of each pixel in the plurality of sample images.

Optionally, the apparatus further includes a detection module that is configured to perform the step in the foregoing embodiments of performing face detection on the target image to obtain a face region in the target image, and a third obtaining module that is configured to perform the step in the foregoing embodiments of obtaining a trained expression recognition model. The apparatus can further include an expression recognition module that is configured to perform the step in the foregoing embodiments of performing recognition on the face region based on the expression recognition model to obtain an expression class of the face region. The classification module 702 can be further configured to perform the step in the foregoing embodiments of classifying each pixel in the target image based on the pixel classification model, in a case that the expression class of the face region is a target expression class.

Additionally, the first processing module 703 may include a target processing unit that is configured to perform the step in the foregoing embodiments of determining a target processing mode corresponding to a target expression class, and an editing unit that is configured to perform the step in the foregoing embodiments of editing the head region by using the target processing mode.

Further, the apparatus can further include a fourth obtaining module that is configured to perform the step in the foregoing embodiments of obtaining a plurality of sample face images and an expression class of each sample face image, and a second training module that is configured to perform the step in the foregoing embodiments of performing training according to the plurality of sample face images and the expression class of each sample face image. The apparatus can further include a video processing module that is configured to perform the step in the foregoing embodiments of obtaining a target video and using each of the plurality of images as the target image.

Further, the first processing module 703 can include a scaling unit that is configured to perform the step in the foregoing embodiments of scaling up or scaling down the head region, a material addition unit, configured to perform the step in the foregoing embodiments of adding material to the head region, or dynamic processing unit, configured to perform the step in the foregoing embodiments of displaying a dynamic effect of shaking the head region.

The foregoing division of the functional modules is merely used as an example for description when the image processing apparatus provided in the foregoing embodiments processes an image. During actual application, the foregoing functions may be allocated to and completed by different functional modules according to requirements, that is, the inner structure of a terminal is divided into different functional modules to implement all or some of the functions described above. In addition, the image processing apparatus provided in the foregoing embodiment can be configured based on the image processing method. See the method embodiments for a specific implementation process thereof.

The foregoing image processing apparatus may be implemented in the form of a computer program. The computer program may be run on the terminal. A computer-readable storage medium, such as a non-transitory computer-readable storage medium, on the terminal may store program modules forming the image processing apparatus, for example, the first obtaining module 701, the classification module 702, and the first processing module 703 shown in FIG. 7. The computer program formed by the program modules, when executed by a processor, causes the processor to perform the steps in the image processing method in the embodiments of this application.

Figure 8:
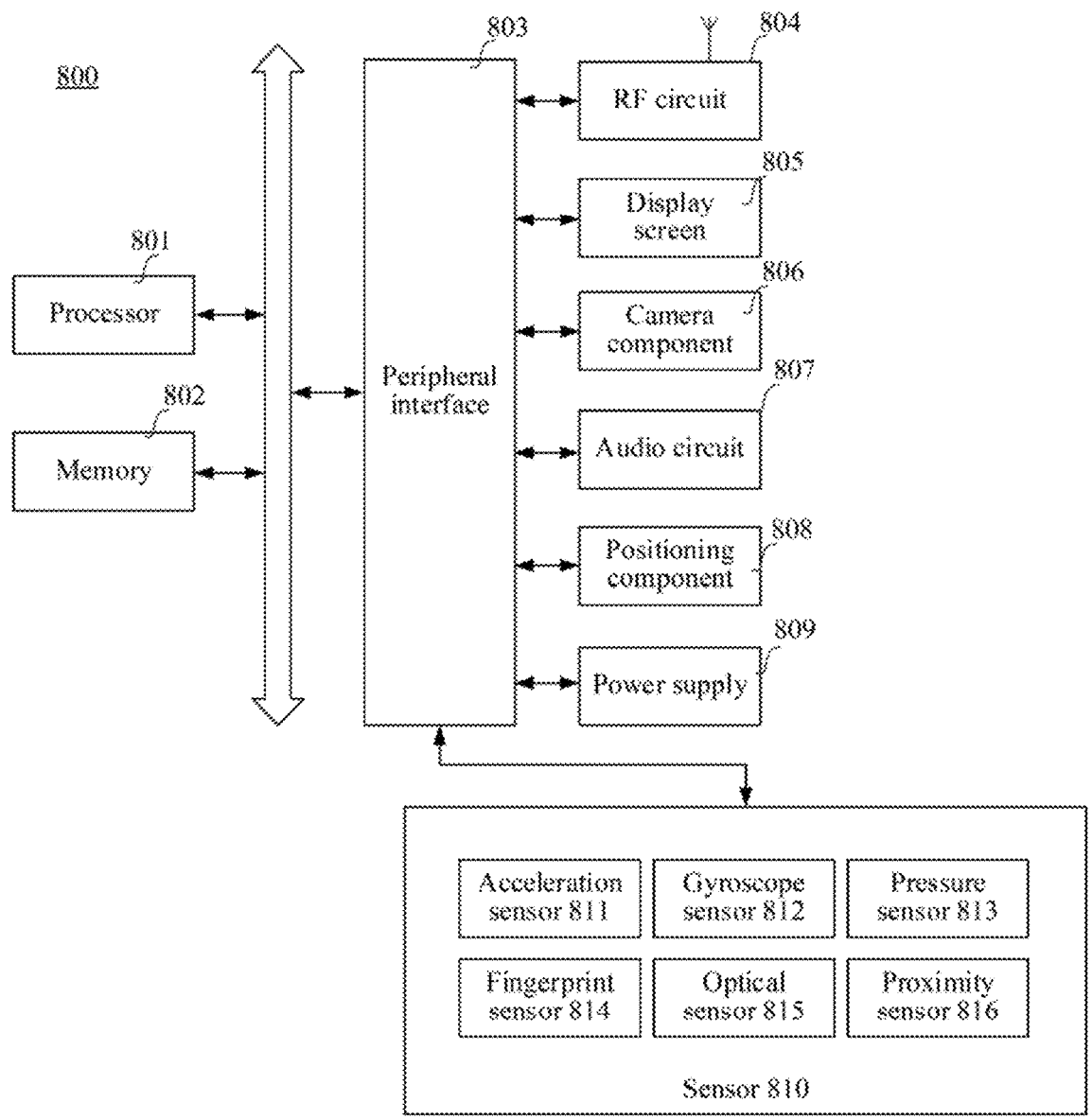
FIG. 8 is a schematic structural diagram of a terminal according to an embodiment of the present disclosure.

FIG. 8 is a schematic structural diagram of a terminal 800 according to an exemplary embodiment of the present disclosure. The terminal 800 may be a portable mobile terminal, for example, a smartphone, a tablet computer, a Moving Picture Experts Group Audio Layer III (MP3) player, a Moving Picture Experts Group Audio Layer IV (MP4) player, a notebook computer, a desktop computer, a head mounted device or any another smart terminal. The terminal 800 may also be referred to as another name such as user equipment, a portable terminal, a laptop terminal, or a desktop terminal.

Generally, the terminal 800 includes a processor 801 and a memory 802. The processor 801 may include one or more processing cores, for example, a 4-core processor or an 8-core processor. Processing circuitry such as the processor 801 may be implemented in at least one hardware form of a digital signal processor (DSP), a field-programmable gate array (FPGA), and a programmable logic array (PLA). The processor 801 may also include a main processor and a coprocessor. The main processor is a processor configured to process data in an awake state and is also referred to as a central processing unit (CPU). The coprocessor is a low power consumption processor configured to process the data in a standby state. In some embodiments, the processor 801 may be integrated with a graphics processing unit (GPU). The GPU is configured to be responsible for rendering and drawing content that a display screen needs to display. In some embodiments, the processor 801 may further include an artificial intelligence (AI) processor. The AI processor is configured to process a calculation operation related to machine learning.

The memory 802 may include one or more computer-readable storage media. The computer-readable storage medium may be a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. For the purpose of description instead of limitation, the RAM is available in a plurality of forms such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM). In some embodiments, a non-transitory computer-readable storage medium in the memory 802 is configured to store at least one instruction, and the at least one instruction is used to be executed by the processor 801 to implement the operations of the image processing method provided in the method embodiment of this application.

In some embodiments, the terminal 800 may further optionally include a peripheral interface 803 and at least one peripheral. The processor 801, the memory 802, and the peripheral interface 803 may be connected by a bus or a signal cable. Each peripheral may be connected to the peripheral interface 803 by a bus, a signal cable or a circuit board. Specifically, the peripheral includes at least one of a radio frequency (RF) circuit 804, a touch display screen 805, a camera component 806, an audio circuit 807, a positioning component 808, and a power supply 809.

The peripheral interface 803 may be configured to connect at least one input/output (I/O)-related peripheral to the processor 801 and the memory 802. In some embodiments, the processor 801, the memory 802, and the peripheral interface 803 are integrated into the same chip or circuit board. In some other embodiments, any one or two of the processor 801, the memory 802, and the peripheral interface 803 may be implemented on an independent chip or circuit board. This is not limited in this embodiment.

The RF circuit 804 is configured to receive and transmit an RF signal, which is also referred to as an electromagnetic signal. The RF circuit 804 communicates with a communications network and another communications device by using the electromagnetic signal. The RF circuit 804 converts an electrical signal into an electromagnetic signal for transmission, or converts a received electromagnetic signal into an electrical signal. Optionally, the RF circuit 804 includes an antenna system, an RF transceiver, one or more amplifiers, a tuner, an oscillator, a digital signal processor, a codec chip set, a subscriber identity module card, and the like. The RF circuit 804 may communicate with another terminal by using at least one wireless communication protocol. The wireless communication protocol includes, but is not limited to, a metropolitan area network, various generations (2G, 3G, 4G, and 5G) of mobile communications networks, a wireless local area network, and/or a Wi-Fi network. In some embodiments, the RF circuit 804 may further include a near field communication (NFC) related circuit. This is not limited in this application.

The display screen 805 is configured to display a user interface (UI). The UI may include an image, a text, an icon, a video, and any combination thereof. When the display screen 805 is a touch display screen, the display screen 805 is further capable of acquiring a touch signal on or over the surface of the display screen 805. The touch signal may be inputted into the processor 801 as a control signal for processing. In this case, the display screen 805 may further be configured to provide a virtual button and/or a virtual keyboard, which is also referred to as a soft button and/or a soft keyboard. In some embodiments, one display screen 805 may be disposed on the front panel of the terminal 800. In some other embodiments, at least two display screens 805 may be separately disposed on different surfaces of the terminal 800 or designed in a foldable form. In still some other embodiments, the display screen 805 may be a flexible display screen disposed on a curved surface or a folded surface of the terminal 800. Even, the display screen 805 may further be disposed to have a non-rectangular irregular graph, that is, a special-shaped screen. The display screen 805 may be manufactured by using a material such as a liquid crystal display (LCD), an organic light-emitting diode (OLED) or the like.

The camera component 806 is configured to acquire an image or a video. Optionally, the camera component 806 includes a front-facing camera and a rear-facing camera. Generally, the front-facing camera is disposed on the front panel of the terminal, and the rear-facing camera is disposed on the back face of the terminal. In some embodiments, there are at least two rear-facing cameras, each being any one of a main camera, a depth-of-field camera, a wide-angle camera, and a telephoto camera, to implement a background blurring function through fusion of the main camera and the depth-of-field camera, panoramic photo shooting and virtual reality (VR) shooting functions through fusion of the main camera and wide-angle camera, or another fusion shooting function. In some embodiments, the camera component 806 may further include a flash. The flash may be a single color temperature flash or a double color temperature flash. The double color temperature flash is a combination of a warm flash and a cold flash, and may be configured to perform light ray compensation at different color temperatures.

The audio circuit 807 may include a microphone and a loudspeaker. The microphone is configured to acquire a sound wave of a user and an environment, and convert the sound wave into an electrical signal, and input the electrical signal into the processor 801 for processing, or input electrical signal into the RF circuit 804 for implementing voice communication. For the purpose of stereo acquisition or noise reduction, there may be a plurality of microphones, disposed at different parts of the terminal 800 respectively. The microphone may be alternatively a microphone array or an omnidirectional acquisition microphone. The loudspeaker is configured to convert the electrical signal from the processor 801 or the RF circuit 804 into the sound wave. The loudspeaker may be a conventional thin-film loudspeaker or a piezoelectric ceramic loudspeaker. In a case that the loudspeaker is a piezoelectric ceramic loudspeaker, an electric signal may be converted into a sound wave audible to the human ear or may be converted into a sound wave inaudible to the human ear for ranging and the like. In some embodiments, the audio circuit 807 may further include an earphone jack.

The positioning component 808 is configured to locate a current geographic location of the terminal 800, to implement navigation or a location based service (LBS). The positioning component 808 may be a positioning component based on the Global Positioning System (GPS) of the United States, the BeiDou system of China, the GLONASS System of Russia or the GALILEO System of the European Union.

The power supply 809 is configured to supply power to various components in the terminal 800. The power supply 809 may be alternating current, direct current, a disposable battery or a rechargeable battery. When the power supply 809 includes a rechargeable battery, the rechargeable battery may support wired charging or wireless charging. The rechargeable battery may further be configured to support a quick charge technology.

In some embodiments, the terminal 800 may further include one or more sensors 810. The one or more sensors 810 include, but are not limited to, an acceleration sensor 811, a gyroscope sensor 812, a pressure sensor 813, a fingerprint sensor 814, an optical sensor 815, and a proximity sensor 816.

The acceleration sensor 811 may detect accelerations on three coordinate axes of a coordinate system established by the terminal 800. For example, the acceleration sensor 811 may be configured to detect a component of gravity acceleration on the three coordinate axes. The processor 801 may control, according to a gravity acceleration signal acquired by the acceleration sensor 811, the touch display screen 805 to display the UI in landscape view or portrait view. The acceleration sensor 811 may further be configured to acquire motion data of a game or a user.

The gyroscope sensor 812 may detect a body direction and a rotation angle of the terminal 800. The gyroscope sensor 812 may cooperate with the acceleration sensor 811 to acquire a 3D action by the user on the terminal 800. The processor 801 may implement the following functions according to the data acquired by the gyroscope sensor 812: motion sensing (for example, changing the UI according to a tilt operation of the user), image stabilization at shooting, game control, and inertial navigation.

The pressure sensor 813 may be disposed at a side frame of the terminal 800 and/or a lower layer of the touch display screen 805. When the pressure sensor 813 is disposed on the side frame of the terminal 800, a holding signal of the user on the terminal 800 may be detected, and left/right hand recognition and a quick action may be performed by the processor 801 according to the holding signal acquired by the pressure sensor 813. When the pressure sensor 813 is disposed on the lower layer of the touch display screen 805, the processor 801 controls an operable control on the UI according to a pressure operation of the user on the touch display screen 805. The operable control includes at least one of a button control, a scroll-bar control, an icon control, and a menu control.

The fingerprint sensor 814 is configured to acquire a user's fingerprint, and the processor 801 identifies the user's identity according to the fingerprint acquired by the fingerprint sensor 814, or the fingerprint sensor 814 identifies the user's identity according to the acquired fingerprint. When the user's identity is identified as a trusted identity, the processor 801 authorizes the user with relevant sensitive actions, the sensitive actions include unlocking screen, viewing encrypted information, downloading software, payment, changing setting, and the like. The fingerprint sensor 814 may be disposed on the front face, the back face, or a side face of the terminal 800. When a physical button or a manufacturer logo is disposed on the terminal 800, the fingerprint sensor 814 may be integrated with the physical button or the manufacturer logo.

The optical sensor 815 is configured to acquire ambient light intensity. In an embodiment, the processor 801 may control the display brightness of the touch display screen 805 according to the ambient light intensity acquired by the optical sensor 815. Specifically, when the ambient light intensity is relatively high, the display brightness of the touch display screen 805 is turned up. When the ambient light intensity is relatively low, the display brightness of the touch display screen 805 is turned down. In another embodiment, the processor 801 may further dynamically adjust a camera parameter of the camera component 806 according to the ambient light intensity acquired by the optical sensor 815.

The proximity sensor 816, also referred to as a distance sensor, is generally disposed on the front panel of the terminal 800. The proximity sensor 816 is configured to acquire a distance between the user and the front surface of the terminal 800. In an embodiment, when the proximity sensor 816 detects that the distance between the user and the front surface of the terminal 800 gradually decreases, the touch display screen 805 is controlled by the processor 801 to switch from a screen-on state to a screen-off state. When the proximity sensor 816 detects that the distance between the user and the front surface of the terminal 800 gradually increases, the touch display screen 805 is controlled by the processor 801 to switch from the screen-off state to the screen-on state.

A person skilled in the art may understand that the structure shown in FIG. 8 does not constitute a limitation on the terminal 800, and the terminal may include more or fewer components than those shown in the figure, or some components may be combined, or a different component deployment may be used.

An embodiment of the present disclosure further provides an image processing terminal. The terminal includes a processor and a memory. The memory stores at least one instruction, at least one program, a code set or an instruction set. The instruction, the program, the code set or the instruction set is loaded by the processor and has operations of performing the image processing method in the foregoing embodiment.

An embodiment of the present disclosure further provides a computer-readable storage medium. The computer-readable storage medium stores at least one instruction, at least one program, a code set or an instruction set. The instruction, the program, the code set or the instruction set is loaded by a processor and has operations of performing the image processing method in the foregoing embodiment.

A person of ordinary skill in the art may understand that all or some of the steps of the embodiments may be implemented by hardware or a program instructing relevant hardware. The program may be stored in a computer-readable storage medium. The storage medium mentioned above may be a ROM, a magnetic disk or an optical disc.

The technical features in the foregoing embodiments may be combined in other manners. For concise description, not all possible combinations of the technical features in the embodiments are described. However, the combinations of the technical features shall all be considered as falling within the scope recorded in this specification provided that they do not conflict with each other.

The foregoing embodiments only show several exemplary implementations of this application and are described in detail, but they are not to be construed as a limitation to the patent scope of the present disclosure. A person of ordinary skill in the art may make various changes and improvements without departing from the concept of this application, which shall all fall within the protection scope of this application. Therefore, the protection scope of the patent of this application shall be subject to the appended claims.

What is claimed is:

1. An image processing method performed by a terminal, the image processing method comprising:
performing face detection on a target image to detect a face region in the target image;
determining an expression class of the detected face region based on a trained expression recognition model;
determining whether the determined expression class of the detected face region is a particular expression class among plural detectable expression classes that is associated with a target processing mode;
in response to the determined expression class being the particular expression class that is associated with the target processing mode,
performing a pixel-level classification on the target image based on a trained pixel classification model to identify pixels corresponding to a head included in the target image; and
editing the identified pixels corresponding to the head included in the target image according to the target processing mode; and
in response to the determined expression class not being the particular expression class that is associated with the target processing mode, not performing the pixel-level classification on the target image.

2. The image processing method according to claim 1, wherein the editing the identified pixels corresponding to the head included in the target image further comprises:
determining the target processing mode according to a correspondence between a type of the particular expression class and the target processing mode; and
editing the identified pixels corresponding to the head included in the target image based on the determined target processing mode.

3. The image processing method according to claim 1, wherein the editing the identified pixels corresponding to the head included in the target image comprises one of (i) scaling up the identified pixels corresponding to the head included in the target image, (ii) scaling down the identified pixels corresponding to the head included in the target image, (iii) adding a light effect to the identified pixels corresponding to the head included in the target image, or (iv) displaying a dynamic effect of shaking the identified pixels corresponding to the head included in the target image.

4. The image processing method according to claim 1, wherein the performing the pixel-level classification on the target image based on the trained pixel classification model comprises:
classifying each pixel in the target image as (i) located in a head region or (ii) not located in the head region by applying the trained pixel classification model to the target image; and
identifying the head region in the target image, the head region being defined by first pixels in the target image, each of the first pixels being classified as located in the head region.

5. The image processing method according to claim 4, further comprising:
obtaining a plurality of sample images and a sample classification identifier of each pixel in the plurality of sample images; and
performing training according to the plurality of sample images and the sample classification identifier of each pixel in the plurality of sample images until a classification accuracy of the trained pixel classification model reaches a threshold.

6. The image processing method according to claim 1, wherein the trained pixel classification model comprises a deep neural network model.

7. The image processing method according to claim 1, further comprising:
obtaining the trained expression recognition model by
obtaining a plurality of sample face images and a sample expression class of each sample face image; and
performing training according to the plurality of sample face images and the sample expression class of each sample face image until a recognition accuracy of the trained expression recognition model reaches a second preset threshold.

8. The image processing method according to claim 1, wherein the trained expression recognition model comprises a deep neural network model.

9. The image processing method according to claim 1, further comprising:
obtaining a target video that includes a plurality of images in a video sequence, the target image being one of the plurality of images.

10. An image processing terminal, comprising:
processing circuitry configured to:
perform face detection on a target image to detect a face region in the target image;
determine an expression class of the detected face region based on a trained expression recognition model;
determine whether the determined expression class of the detected face region is a particular expression class among plural detectable expression classes that is associated with a target processing mode;
in response to the determined expression class being the particular expression class that is associated with the target processing mode,
perform a pixel-level classification on the target image based on a trained pixel classification model to identify pixels corresponding to a head included in the target image; and
edit the identified pixels corresponding to the head included in the target image according to the target processing mode; and
in response to the determined expression class not being the particular expression class that is associated with the target processing mode, not perform the pixel-level classification on the target image.

11. The image processing terminal according to claim 10, wherein the processing circuitry is configured to:
determine the target processing mode according to a correspondence between a type of the particular expression class and the target processing mode; and
edit the identified pixels corresponding to the head included in the target image based on the determined target processing mode.

12. The image processing terminal according to claim 10, wherein the processing circuitry is configured to:
perform one of (i) scaling up the identified pixels corresponding to the head included in the target image, (ii) scaling down the identified pixels corresponding to the head included in the target image, (iii) adding a light effect to the identified pixels corresponding to the head included in the target image, or (iv) displaying a dynamic effect of shaking the identified pixels corresponding to the head included in the target image.

13. The image processing terminal according to claim 10, wherein the processing circuitry is configured to:
   classify each pixel in the target image as (i) located in a head region or (ii) not located in the head region by applying the trained pixel classification model to the target image; and
   identify the head region in the target image, the head region being defined by first pixels in the target image, each of the first pixels being classified as located in the head region.

14. The image processing terminal according to claim 13, wherein the processing circuitry is configured to:
   obtain a plurality of sample images and a sample classification identifier of each pixel in the plurality of sample images; and
   perform training according to the plurality of sample images and the sample classification identifier of each pixel in the plurality of sample images until a classification accuracy of the trained pixel classification model reaches a threshold.

15. The image processing terminal according to claim 10, wherein the trained pixel classification model comprises a deep neural network model.

16. The image processing terminal according to claim 10, wherein the processing circuitry is configured to:
   obtain the trained expression recognition model by
      obtaining a plurality of sample face images and a sample expression class of each sample face image; and
      performing training according to the plurality of sample face images and the sample expression class of each sample face image until a recognition accuracy of the trained expression recognition model reaches a second preset threshold.

17. The image processing terminal according to claim 10, wherein the trained expression recognition model comprises a deep neural network model.

18. The image processing terminal according to claim 10, wherein the processing circuitry is configured to:
   obtain a target video that includes a plurality of images in a video sequence, the target image being one of the plurality of images.

19. A non-transitory computer-readable storage medium that stores at least one instruction that, when executed by processing circuitry, causes the processing circuitry to perform an image processing method comprising:
   performing face detection on a target image to detect a face region in the target image;
   determining an expression class of the detected face region based on a trained expression recognition model;
   determining whether the determined expression class of the detected face region is a particular expression class among plural detectable expression classes that is associated with a target processing mode;
   in response to the determined expression class being the particular expression class that is associated with the target processing mode,
      performing a pixel-level classification on the target image based on a trained pixel classification model to identify pixels corresponding to a head included in the target image; and
      editing the identified pixels corresponding to the head included in the target image according to the target processing mode; and
   in response to the determined expression class not being the particular expression class that is associated with the target processing mode, not performing the pixel-level classification on the target image.

20. The image processing method according to claim 1, wherein
   the pixel-level classification performed on the target image based on the trained pixel classification model is different from the trained expression recognition model.

* * * * *